(12) United States Patent
Takahashi

(10) Patent No.: US 12,418,230 B2
(45) Date of Patent: Sep. 16, 2025

(54) METAL MELT PUMP

(71) Applicant: ZMAG, LTD., Shiroi (JP)

(72) Inventor: Kenzo Takahashi, Shiroi (JP)

(73) Assignee: ZMAG, LTD., Shiroi (JP)

( * ) Notice: Subject to any disclaimer, the term of this patent is extended or adjusted under 35 U.S.C. 154(b) by 215 days.

(21) Appl. No.: 18/331,005

(22) Filed: Jun. 7, 2023

(65) Prior Publication Data

US 2023/0318428 A1 Oct. 5, 2023

Related U.S. Application Data

(63) Continuation of application No. PCT/JP2021/045309, filed on Dec. 9, 2021.

(30) Foreign Application Priority Data

Dec. 21, 2020 (JP) .................................. 2020-211458

(51) Int. Cl.
*H02K 44/06* (2006.01)
*F27D 27/00* (2010.01)

(52) U.S. Cl.
CPC .......... *H02K 44/06* (2013.01); *F27D 27/005* (2013.01)

(58) Field of Classification Search
CPC ....... H02K 44/06; F27D 27/005; F04D 7/065; B22D 1/00; B22D 27/02; B22D 35/00

(Continued)

(56) References Cited

U.S. PATENT DOCUMENTS

| 2,928,349 A | * | 3/1960 | Findlay | .................. | H02K 44/06 |
| | | | | | 417/50 |
| 3,302,573 A | * | 2/1967 | Ledeen | .................. | H02K 44/06 |
| | | | | | 310/11 |

(Continued)

FOREIGN PATENT DOCUMENTS

| JP | 2011139611 A | * | 12/2009 | ............. H02K 44/06 |
| JP | 2010-169381 A | | 8/2010 | |

(Continued)

OTHER PUBLICATIONS

PCT International Search Report of PCT Application No. PCT/JP2021/045309 Mailed on Feb. 15, 2022.

(Continued)

*Primary Examiner* — Mark A Laurenzi
*Assistant Examiner* — Benjamin Doyle
(74) *Attorney, Agent, or Firm* — WTA IP Law P.C.

(57) ABSTRACT

A metal melt pump includes a bottomed cylinder body including a side wall and a bottom wall, a melt flow passage body including a melt flow passage that connects a suction port and an ejection port and being a body separate from the bottomed cylinder body, and a melt driving part including a magnetic field device and adapted to drive metal melt in the melt flow passage. The magnetic field device includes a plurality of permanent magnets arranged such that different magnetic poles are alternately arrayed along a circumference of a shaft, and the melt flow passage body is removably provided on the bottomed cylinder body at a position below the bottomed cylinder body and where a magnetic force line from one of the permanent magnets penetrates through the bottom wall downward to reach the melt flow passage.

10 Claims, 12 Drawing Sheets

(58) Field of Classification Search
USPC .............................. 417/410.1; 266/233, 234
See application file for complete search history.

(56) References Cited

U.S. PATENT DOCUMENTS

| | | | | |
|---|---|---|---|---|
| 3,411,447 | A * | 11/1968 | Fox | H02K 44/06 417/50 |
| 3,686,420 | A * | 8/1972 | Bruning | F27D 11/08 373/95 |
| 3,776,660 | A * | 12/1973 | Anderson | F04D 7/065 415/196 |
| 5,684,352 | A * | 11/1997 | Mita | H02K 1/02 310/152 |
| 10,215,495 | B2 * | 2/2019 | Bosworth | F27D 3/00 |
| 10,281,216 | B2 * | 5/2019 | Takahashi | B22D 35/00 |
| 2006/0133194 | A1 * | 6/2006 | Takahashi | F27B 17/00 366/147 |
| 2009/0285695 | A1 * | 11/2009 | Kagan | F04B 15/06 417/423.1 |
| 2010/0104415 | A1 * | 4/2010 | Morando | F04D 1/14 415/206 |
| 2010/0244338 | A1 | 9/2010 | Takahashi | |
| 2011/0248432 | A1 * | 10/2011 | Takahashi | F27D 27/005 266/237 |
| 2014/0252698 | A1 * | 9/2014 | Rauch | F27D 21/0014 266/233 |
| 2020/0363128 | A1 * | 11/2020 | Cooper | F27B 3/045 |
| 2021/0001397 | A1 | 1/2021 | Takahashi | |

FOREIGN PATENT DOCUMENTS

| | | | | |
|---|---|---|---|---|
| JP | WO2019181884 A1 * | 9/2019 | | B22D 17/30 |
| JP | 6633258 B1 | 1/2020 | | |
| WO | WO 2019-0181884 A1 | 9/2019 | | |

OTHER PUBLICATIONS

Extended European Search Report of Ep Application No. 21910348.8 mailed on Sep. 2, 2024.
PCT International Preliminary Report on Patentability of PCT Application No. PCT/JP2021/045309 Mailed on Jun. 29, 2023.

* cited by examiner

METAL MELT PUMP

CROSS-REFERENCE TO RELATED APPLICATIONS

This application is a bypass continuation of International PCT Application No. PCT/JP2021/045309, filed on Dec. 9, 2021, which claims priority to Japanese Patent Application No. 2020-211458, filed on Dec. 21, 2020, which are incorporated by reference herein in their entirety,

TECHNICAL FIELD

The present invention relates to a metal melt pump, and more particularly to a metal melt pump that circulates or stir metal melt inside a furnace or transfers metal melt.

BACKGROUND ART

Conventionally, there has been known a metal melt pump that drives non-ferrous metal melt (hereinafter simply referred to as "metal melt" or "melt"), such as conductors, e.g., Al, Cu, and Zn or an alloy of at least two of them, or an Mg alloy, using an electromagnetic force. As one type of such a metal melt pump, Japanese Patent No. 6633258 describes a pump that drives metal melt using an electromagnetic force generated by a magnetic force line, which is output from a permanent magnet, moving while penetrating the metal melt.

The metal melt pump of Japanese Patent No. 6633258 includes an outer cylinder with a melt inlet provided on a bottom wall thereof and an inner cylinder that is removably contained in the outer cylinder, and houses a magnetic field device inside the inner cylinder. A ring-shaped spacer is interposed between an inner surface of the bottom wall of the outer cylinder and an outer surface of a bottom wall of the inner cylinder, and a pump chamber (spiral chamber) is partitioned and formed by the spacer, the bottom wall of the outer cylinder, and the bottom wall of the inner cylinder.

SUMMARY

The metal melt pump of Japanese Patent No. 6633258 has been invented by the inventor of the present invention. Since then, the inventor has continued earnest efforts on research and development for realization of a more practical, easily manageable metal melt pump with a high performance. In such efforts, the following problems have uniquely been found.

Since metal melt is driven by an electromagnetic force to flow at a high speed in the pump chamber, the bottom wall of the outer cylinder, the bottom wall of the inner cylinder, and the spacer that partition and form the pump chamber are more likely to be extremely damaged as compared to the other portions. However, since the outer cylinder and the inner cylinder form a main body portion, it is impossible to renew only the pump chamber. Further, due to damage to or deterioration of the spacer, melt inside the pump chamber could leak or the ejection pressure could significantly decrease.

In a case where troubles such as damage to the pump chamber or melt leakage occur, the device of the metal melt pump needs to be wholly replaced, which requires a long period of time for recovery as well as enormous cost.

Further, in the metal melt pump of Japanese Patent No. 6633258, since the melt inlet to suck melt inside a furnace is provided on a bottom surface of a container (outer cylinder), the metal melt pump needs to be installed such that it is spaced upward from a bottom of the furnace using a leg body. In order to reduce a suction resistance of the melt, the height of the leg body needs to be raised, but in that case, it is difficult to secure stability of the metal melt pump inside the furnace.

The present invention has been made on the basis of the aforementioned recognition, and an object of the present invention is to provide a low-cost metal melt pump with excellent maintainability and high performance.

A metal melt pump according to the present invention includes a bottomed cylinder body including a side wall and a bottom wall, a melt flow passage body including a melt flow passage that connects a suction port and an ejection port, the melt flow passage body being a body separate from the bottomed cylinder body, and a melt driving part including a magnetic field device rotatably disposed around a vertically oriented rotary shaft inside the bottomed cylinder body and an electric motor that rotates the magnetic field device, in which the suction port opens on a side surface of the melt flow passage body, the magnetic field device includes a plurality of permanent magnets, the plurality of permanent magnets each have an upper face magnetic pole and a lower face magnetic pole that are magnetized such that an upper face portion and a lower face portion become magnetic poles, the plurality of lower face magnetic poles of the plurality of permanent magnets vertically faces the bottom wall, the plurality of permanent magnets is arranged such that lower face magnetic poles with different polarities are alternately arrayed along a circumference of the rotary shaft, and the melt flow passage body is removably provided on the bottomed cylinder body at a position below the bottomed cylinder body and where a magnetic force line from a first permanent magnet among the plurality of permanent magnets penetrates through the bottom wall of the bottomed cylinder body downward to reach the melt flow passage and penetrates from the melt flow passage through the bottom wall of the bottomed cylinder body upward to return to a second permanent magnet adjacent to the first permanent magnet.

Further, in the metal melt pump, the melt flow passage body may include an inner side flow passage wall, an outer side flow passage wall, an upper side flow passage wall, and a lower side flow passage wall, with a longitudinal cross-section in a closed shape.

Furthermore, in the metal melt pump, the melt flow passage body may include an inner side flow passage wall, an outer side flow passage wall, and a lower side flow passage wall, without including an upper side flow passage wall, with an upper face opened.

Further, in the metal melt pump, the melt flow passage body may include an inner side flow passage wall, an outer side flow passage wall, and an upper side flow passage wall, without including a lower side flow passage wall, with a lower face opened.

Furthermore, in the metal melt pump, the melt flow passage may include an acceleration flow passage along a rotating direction of the magnetic field device, an inlet side flow passage that connects the suction port and the acceleration flow passage, and an outlet side flow passage that connects the acceleration flow passage and the ejection port.

Further, in the metal melt pump, the melt flow passage body may have a planar shape in a substantially U-shape.

In addition, in the metal melt pump, the melt flow passage body may have a planar shape in a wave shape.

Further, in the metal melt pump, the melt flow passage body may have a planar shape in a substantially L-shape.

Furthermore, in the metal melt pump, a longitudinal cross-sectional shape of the melt flow passage may be a laterally-long and substantially rectangular shape.

Moreover, in the metal melt pump, the melt flow passage body may be removably attached to the bottomed cylinder body by means of a fixture.

In addition, in the metal melt pump, the bottom wall of the bottomed cylinder body may be provided with a projection for fixation, and the projection for fixation may engage with a recess surrounded by an inner side flow passage wall of the melt flow passage body.

According to the present invention, a low-cost metal melt pump with excellent maintainability and high performance can be provided.

DETAILED DESCRIPTION OF EMBODIMENTS

Figure 1:
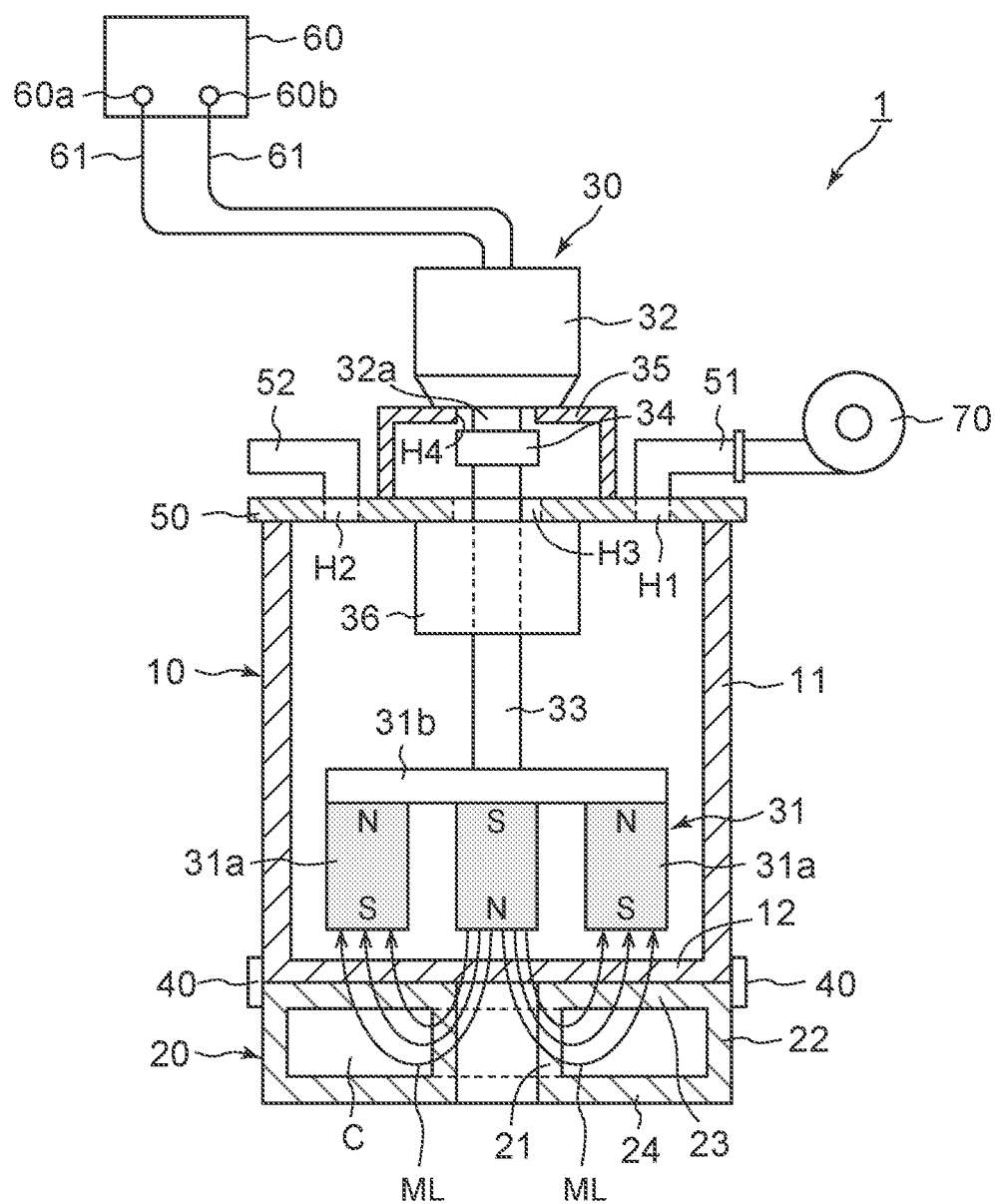
FIG. 1 is a cross-sectional view showing the schematic configuration of a metal melt pump according to an embodiment.

Hereinafter, an embodiment of the present invention will be described with reference to the drawings. It should be noted that in the drawings, constituent elements having equivalent functions are assigned the same reference signs.

<Metal Melt Pump>

Figure 2:
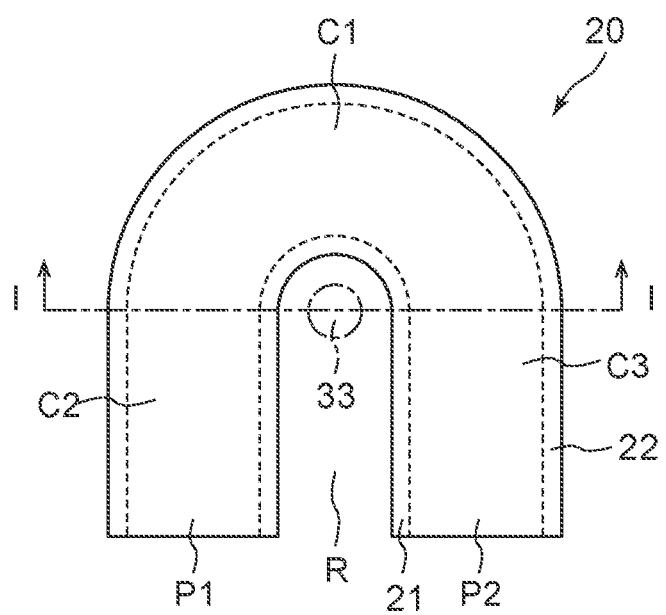
FIG. 2 is a plan view showing a melt flow passage body of the metal melt pump according to the embodiment.
Figure 3:
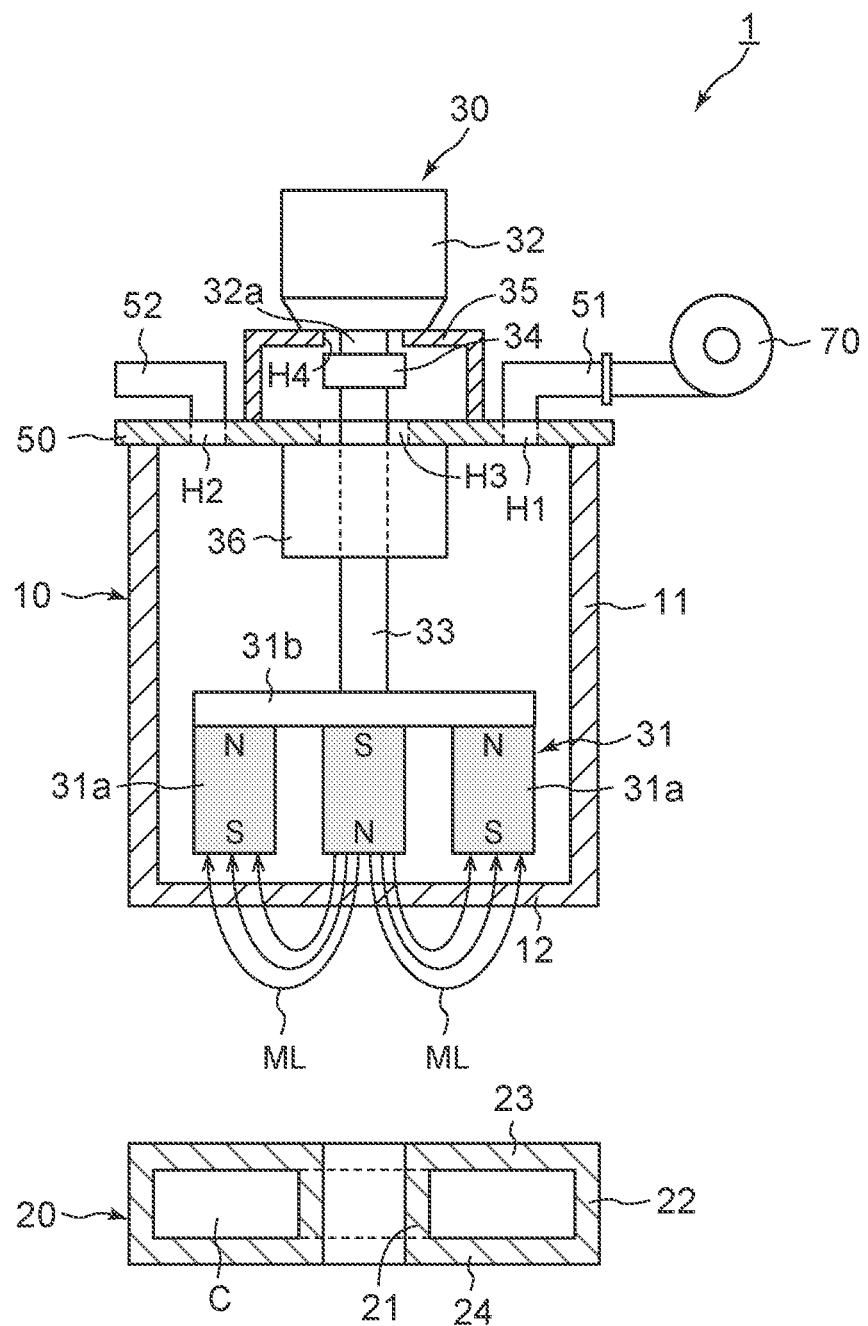
FIG. 3 is an exploded cross-sectional view showing a main body of the metal melt pump and the melt flow passage body removable from the main body according to the embodiment.
Figure 4:
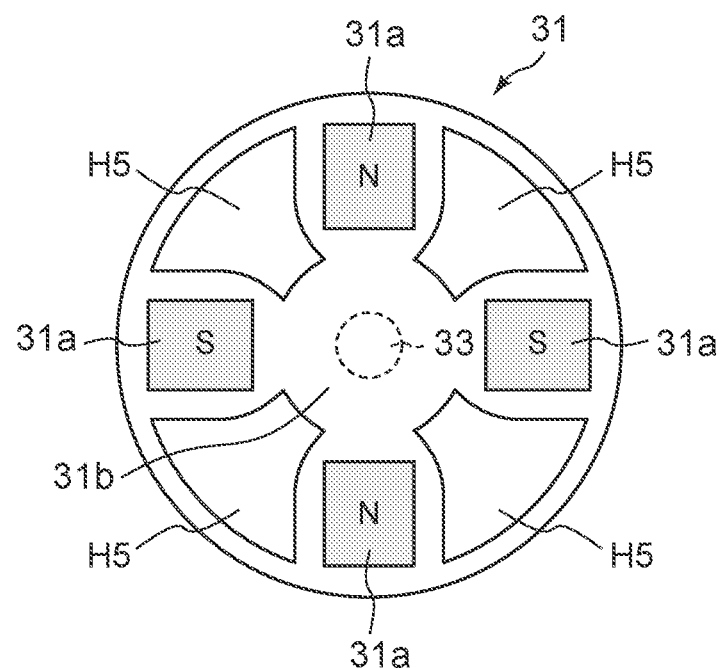
FIG. 4 is a plan view showing a magnetic field device according to the embodiment.
Figure 5:
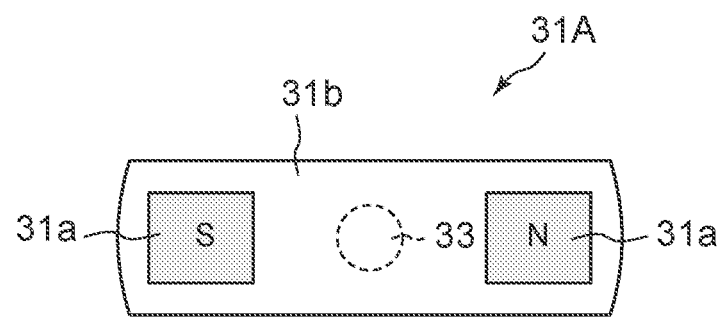
FIG. 5 is a plan view showing a magnetic field device according to a modification of the embodiment.

With reference to FIG. 1 to FIG. 5, the configuration of a metal melt pump 1 according to the embodiment will be described. FIG. 1 is a cross-sectional view taken along line I-I of FIG. 2, showing the schematic configuration of the metal melt pump 1. FIG. 2 is a plan view of a melt flow passage body 20 of the metal melt pump 1. FIG. 3 separately shows a main body (a bottomed cylinder body 10, a melt driving part 30, and the like) of the metal melt pump 1 and the melt flow passage body 20 removable from the main body. FIG. 4 is a plan view of a magnetic field device (rotary magnet body) 31 according to the present embodiment, and FIG. 5 is a plan view of a magnetic field device 31A according to a modification of the embodiment.

The metal melt pump 1 according to the present embodiment is configured so as to be partially (at least the melt flow passage body 20) immersed in metal melt inside a furnace, such as a melting furnace and a holding furnace, to drive the metal melt using an electromagnetic force caused by eddy current as will be described later.

As illustrated in FIG. 1, the metal melt pump 1 includes the bottomed cylinder body 10, the melt flow passage body 20 provided with a melt flow passage C, the melt driving part 30 that drives the metal melt in the melt flow passage C, a fixture 40, a cover body 50, a power control panel 60, and a blower 70.

Hereinafter, the configuration of the metal melt pump 1 will be described in detail.

The bottomed cylinder body 10 is a cylinder body with a bottom including a side wall 11 and a bottom wall 12. The side wall 11 is cylindrically formed. The bottom wall 12 closes a lower end portion of the side wall 11. It should be noted that the side wall 11 may be a cylinder body in a shape other than a cylindrical shape. The bottomed cylinder body 10 is formed of material having fire-resistance (fire-resistant material), for example, bricks.

The melt flow passage body 20 includes the melt flow passage C that connects a suction port P1 and an ejection port P2. At least the suction port P1 opens on a side surface of the melt flow passage body 20. In the present embodiment, the ejection port P2 also opens on the side surface of the melt flow passage body 20. Since the suction port P1 opens on the side surface of the melt flow passage body 20, the melt inside the furnace can be sucked with no leg body interposed between the metal melt pump 1 and the bottom of the furnace.

As illustrated in FIG. 1, in the present embodiment, the melt flow passage C of the melt flow passage body 20 is formed in a shape with the longitudinal cross-section closed. Specifically, the melt flow passage body 20 includes an inner side flow passage wall 21, an outer side flow passage wall 22, an upper side flow passage wall 23, and a lower side flow passage wall 24, and the melt flow passage C with a substantially rectangular longitudinal cross-sectional shape is formed by these flow passage walls. Since the longitudinal cross-section of the melt flow passage C is in a closed shape in such a manner, the ejection pressure of the metal melt can be easily increased. Further, since the melt flow passage C is configured only with the melt flow passage body 20, the melt flow passage C can be completely renewed by replacing the melt flow passage body 20.

As illustrated in FIG. 2, the melt flow passage body 20 includes a recess R surrounded by the inner side flow passage wall 21.

It should be noted that the longitudinal cross-sectional shape of the melt flow passage C is preferably a laterally-long and substantially rectangular shape. In this manner, since the radial length of the melt flow passage C becomes relatively longer under conditions where the cross-sectional area of the flow passage is constant, a magnetic force line from the magnetic field device 31 easily penetrates the metal melt in the melt flow passage C, to thus be able to improve the efficiency in driving the metal melt.

Further, a plurality of melt flow passage bodies 20 with different cross-sectional areas (e.g., height) of the flow passage of the melt flow passage C may be prepared and selectively used in accordance with a desired ejection amount or the like.

It should be noted that the longitudinal cross-sectional shape of the melt flow passage C is not limited to a rectangle, but may be a round, elliptic, or polygonal shape, or the like.

Further, for easier sucking of the metal melt inside the furnace, the vicinity of an inlet of the melt flow passage C may be tapered so as to widen the suction port P1 as compared to the ejection port P2.

As illustrated in FIG. 2, the melt flow passage body 20 has a planar shape in a substantially U-shape. In the present embodiment, the suction port P1 and the ejection port P2 are flush with each other. However, without limiting to this, the suction port P1 and the ejection port P2 may be on different surfaces.

As illustrated in FIG. 2, the melt flow passage C includes an acceleration flow passage C1 along a rotating direction of the magnetic field device 31, an inlet side flow passage C2 that connects the suction port P1 and the acceleration flow passage C1, and an outlet side flow passage C3 that connects the acceleration flow passage C1 and the ejection port P2. The portion on the side above the line I-I of FIG. 2 is the acceleration flow passage C1, and the acceleration flow passage C1 accelerates the melt. The center of the acceleration flow passage C1 substantially corresponds to a shaft 33 in a plan view. Since the melt flow passage C includes the acceleration flow passage, the metal melt in the melt flow passage C can be efficiently driven.

As illustrated in FIG. 1 and FIG. 3, the melt flow passage body 20 is removably provided on the bottomed cylinder body 10 below the bottomed cylinder body 10, as a body separate from the bottomed cylinder body 10. When the metal melt pump 1 is used, the melt flow passage body 20 is immersed in the metal melt inside the furnace and the melt flow passage C is filled with the metal melt (see FIG. 7). The melt flow passage body 20 is formed of material having fire-resistance (fire-resistant material), for example, the same material as that of the bottomed cylinder body 10.

As illustrated in FIG. 1, the melt flow passage body 20 is removably provided on the bottomed cylinder body 10 at a position where a magnetic force line ML from a first permanent magnet among a plurality of permanent magnets 31a of the magnetic field device 31 penetrates through the bottom wall 12 of the bottomed cylinder body 10 downward to reach the melt flow passage C and penetrates from the melt flow passage C through the bottom wall 12 upward to return to a second permanent magnet adjacent to the first permanent magnet.

As illustrated in FIG. 1, the melt flow passage body 20 is removably attached to the bottomed cylinder body 10 by means of the fixture 40. The fixture 40 is, for example, a connecting member in a U-shape facing sideways made of a fire-resistant material, and an end portion of the connecting member is inserted into a hole for fixation (not shown) formed in each of the side wall 11 and the outer side flow passage wall 22, so that the melt flow passage body 20 is removably attached to the bottomed cylinder body 10. The fixture 40 may be a rod-like or a screw-like connecting member.

It should be noted that in FIG. 1, the upper side flow passage wall 23 of the melt flow passage body 20 contacts the bottom wall 12 of the bottomed cylinder body 10 without a gap. In this manner, the distance between the melt flow passage C and the magnetic field device 31 is reduced to thus intensify the magnetic field penetrating the metal melt in the melt flow passage C, thereby enabling the force to drive the metal melt to be enhanced. However, the present invention is not limited thereto, but a gap may be provided between the bottom wall 12 and the upper side flow passage wall 23.

Next, the melt driving part 30 will be described.

The melt driving part 30 is configured so as to drive the metal melt in the melt flow passage C formed in the melt flow passage body 20, using an electromagnetic force. The melt driving part 30 drives the metal melt in the melt flow passage C from the suction port P1 toward the ejection port P2, thereby ejecting the metal melt from the ejection port P2 and causing the metal melt inside the furnace to be sucked into the melt flow passage C from the suction port P1.

The melt driving part 30 includes the magnetic field device (rotary magnet body) 31, an electric motor 32 that rotates the magnetic field device 31, the shaft (rotary shaft) 33 connected to the magnetic field device 31, a coupling (shaft coupling) 34, a mount 35, and a bearing housing 36.

As illustrated in FIG. 1, the magnetic field device 31 is provided in a suspended state inside the bottomed cylinder body 10. The magnetic field device 31 is rotatably disposed around the vertically-oriented shaft 33. As illustrated in FIG. 1 and FIG. 4, the magnetic field device 31 includes the plurality of permanent magnets (magnet pieces) 31a and a support plate 31b that supports the plurality of permanent magnets 31a. In the present embodiment, four permanent magnets 31a are fixed on the support plate 31b. It should be noted that the magnetic field device 31 may further include another support plate (not shown) that sandwiches, together with the support plate 31b, the plurality of permanent magnets 31a from above and below.

The plurality of permanent magnets 31a each have an upper face magnetic pole and a lower face magnetic pole that are magnetized such that an upper face portion and a lower face portion become magnetic poles. Further, the magnetic field device 31 is disposed inside the bottomed cylinder body 10 such that the lower face magnetic poles of the plurality of permanent magnets 31a vertically face the bottom wall 12 of the bottomed cylinder body 10.

As illustrated in FIG. 4, the plurality of permanent magnets 31a is arranged such that the lower face magnetic poles (or the upper face magnetic poles) having different polarities are alternately arrayed along the circumference of the shaft 33. In this manner, the magnetic force line ML output from the N-pole of a certain permanent magnet 31a (first permanent magnet) enters the S-pole of another permanent magnet 31a (second permanent magnet) adjacent to the certain permanent magnet 31a. It should be noted that for forming such magnetic force lines ML for all the permanent magnets 31a, the number of the permanent magnets 31a is preferably an even number.

As illustrated in FIG. 4, the support plate 31b is provided with an air hole H5 to allow cooling air introduced into the bottomed cylinder body 10 to flow around the plurality of permanent magnets 31a.

It should be noted that the shape of the support plate 31b is not limited to that shown in FIG. 4, but may be, for example, a substantially cross shape. Further, when the number of the permanent magnets 31a is two, the shape of the support plate 31b may be rectangular as with the magnetic field device 31A according to a modification of the present embodiment shown in FIG. 5.

In the magnetic field device 31A, the support plate 31*b* is in a plate rod shape, and the permanent magnet 31*a* is fixed to each of the opposite ends of the support plate 31*b*. In the present modification also, two permanent magnets 31*a* are arranged such that the lower face magnetic poles having different polarities are alternately arrayed along the circumference of the shaft 33.

Other than the above, the magnetic field device having six permanent magnets 31*a*, eight permanent magnets 31*a*, and so forth is conceivable. In general, the magnetic field device with a fewer number of permanent magnets has an advantage in that the magnetic force line ML reaches farther. Meanwhile, when the rotation speed of the magnetic field device 31 is the same, the magnetic field device with a greater number of permanent magnets 31*a* has a greater temporal change in the magnetic force line in the metal melt, so that the melt driving force can be increased.

As illustrated in FIG. 1, the electric motor 32 includes a rotary shaft 32*a* and is installed on the mount 35 such that the rotary shaft 32*a* is vertically oriented. The rotary shaft 32*a* is connected to the shaft 33 via the coupling 34. The magnetic field device 31 rotates about the shaft 33 by the rotation of the rotary shaft 32*a*.

As illustrated in FIG. 1, the electric motor 32 is electrically connected to the power control panel 60 via a connecting conductor 61. For example, the electric motor 32 is a DC motor and is connected to a positive electrode terminal 60*a* and a negative electrode terminal 60*b* of the power control panel 60. The rotation speed (namely, the rotation speed of the magnetic field device 31) of the electric motor 32 can be controlled by adjusting the output (voltage, current, and the like) of the power control panel 60. The ejection amount of the metal melt from the ejection port P2 of the melt flow passage body 20 can be increased by increasing the rotation speed of the electric motor 32. In this manner, the electric motor 32 is configured such that the number of rotation of the magnetic field device 31 is variable in accordance with the ejection amount of the metal melt.

It should be noted that the type of the electric motor 32 is not particularly limited, and may be an AC motor or the like. Further, in the case of the AC motor, the rotation speed of the electric motor 32 may be controlled by an inverter (not shown) of the power control panel 60.

As illustrated in FIG. 1, the shaft 33 is inserted through the bearing housing 36 and the cover body 50 (shaft insertion hole H3) and connects the magnetic field device 31 and the electric motor 32. A lower end of the shaft 33 is fixed to the magnetic field device 31 (support plate 31*b*) and an upper end of the shaft 33 is connected to the rotary shaft 32*a* of the electric motor 32 via the coupling 34.

The cover body 50 is a plate-like member that closes an upper opening of the bottomed cylinder body 10. A space that houses the magnetic field device 31 is defined by the cover body 50 and the bottomed cylinder body 10. The cover body 50 is provided with an air intake hole H1, an air discharge hole H2, and the shaft insertion hole H3. An air blowing pipe 51 is provided so as to communicate with the air intake hole H1. The blower 70 that blows air to cool the magnetic field device 31 is connected to the air blowing pipe 51. Further, an air discharging pipe 52 is provided so as to communicate with the air discharge hole H2. The air blown into the bottomed cylinder body 10 from the air blowing pipe 51 is discharged from the air discharging pipe 52 to the outside.

The coupling 34 is a shaft coupling member that couples the rotary shaft 32*a* of the electric motor 32 and the shaft 33 fixed to the magnetic field device 31.

The mount 35 is fixed on the cover body 50 and the electric motor 32 is installed on the mount 35. An upper face of the mount 35 is provided with a shaft insertion hole H4. It should be noted that in a case where the rotary shaft 32*a* and the shaft 33 are integrally formed or the like, the electric motor 32 may be directly installed on the cover body 50 by omitting the mount 35.

The bearing housing 36 houses a bearing (not shown) and is fixed to a lower face of the cover body 50 as illustrated in FIG. 1.

As described above, in the metal melt pump 1 according to the present embodiment, the melt flow passage body 20 is removably provided below the bottomed cylinder body 10, as a body separate from the bottomed cylinder body 10. More specifically, the melt flow passage body 20 is removably provided on the bottomed cylinder body 10 at a position below the bottomed cylinder body 10 and where the magnetic force line from the first permanent magnet among the plurality of permanent magnets 31*a* penetrates through the bottom wall 12 of the bottomed cylinder body 10 downward to reach the melt flow passage C and penetrates from the melt flow passage C through the bottom wall 12 upward to return to the second permanent magnet adjacent to the first permanent magnet.

In this manner, according to the present embodiment, the melt flow passage C can be renewed easily and at low cost by replacing the melt flow passage body 20. Consequently, the metal melt in the melt flow passage C can be efficiently driven in use, and in a case where the ejection amount decreases, the performance of the metal melt pump can be recovered quickly and at low cost by replacing the melt flow passage body 20. As a result, downtime loss can be significantly reduced.

Further, since the suction port P1 for sucking the melt inside the furnace opens on the side surface of the melt flow passage body 20, even in a case where the metal melt pump 1 is directly installed on the bottom of the furnace without using a leg body (leg member), the sucking resistance of the melt is not affected, thereby enabling a sufficient ejection amount to be secured.

In addition, since the melt flow passage body 20 is installed below the bottomed cylinder body 10, the outer diameter of the metal melt pump 1 does not increase. Therefore, according to the present embodiment, the installation performance into the furnace is not lost.

(Modification of Metal Melt Pump)

In the aforementioned description, the bottomed cylinder body 10 and the melt flow passage body 20 are removably connected to each other using the fixture 40, but the two may be connected without using the fixture 40. For example, the bottom wall 12 of the bottomed cylinder body 10 may be provided with a projection (or a recess), and the projection may fit into a recess (or a projection) of the melt flow passage body 20.

Figure 6:
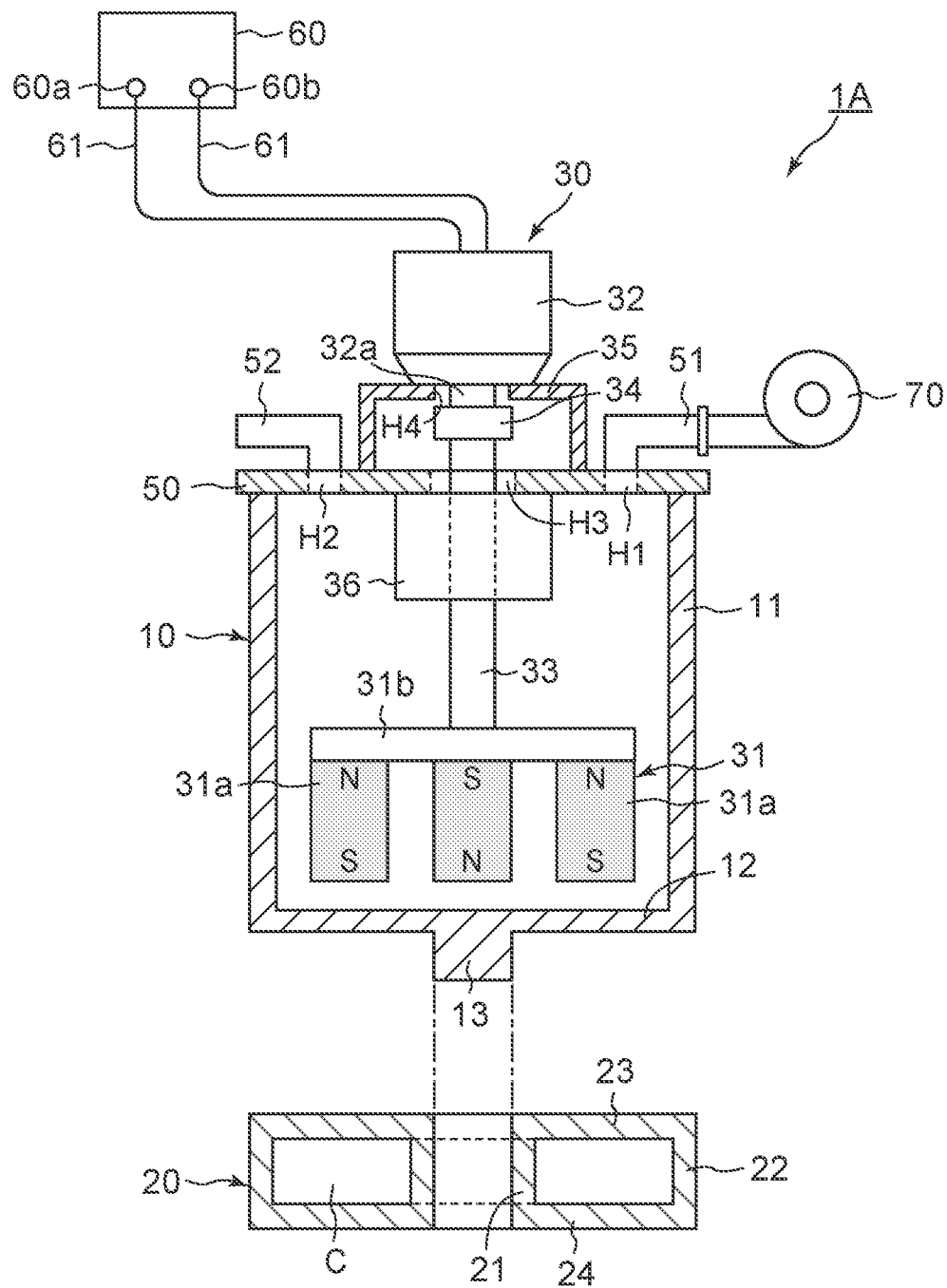
FIG. 6 is a cross-sectional view showing the schematic configuration of a metal melt pump according to the modification of the embodiment.

Such a modification will be described with reference to FIG. 6. FIG. 6 shows a cross-sectional view taken along line I-I of FIG. 2.

In a metal melt pump 1A according to the present modification, the bottom wall 12 of the bottomed cylinder body 10 is provided with a projection for fixation 13, and the projection for fixation 13 engages with the recess R surrounded by the inner side flow passage wall 21 of the melt flow passage body 20, so that the bottomed cylinder body 10 and the melt flow passage body 20 are removably connected to each other.

It should be noted that the projection for fixation 13 may be provided so as to overlap with the shaft 33 in a plan view. Further, in order to firmly removably connect the bottomed cylinder body 10 and the melt flow passage body 20, the planar shape of the projection for fixation 13 may be substantially the same as the planar shape of the recess R of the melt flow passage body 20.

Though not shown, as another modification, the melt flow passage body 20 may be configured so as to include an outer periphery frame part extending upward from an outer periphery end, so as to house a bottom portion of the bottomed cylinder body 10 in the outer periphery frame part. Such an outer periphery frame part may be provided on the bottomed cylinder body 10 side.

<Operation of Metal Melt Pump>

Next, the operation of the metal melt pump 1 according to the embodiment described above will be described.

Figure 7:
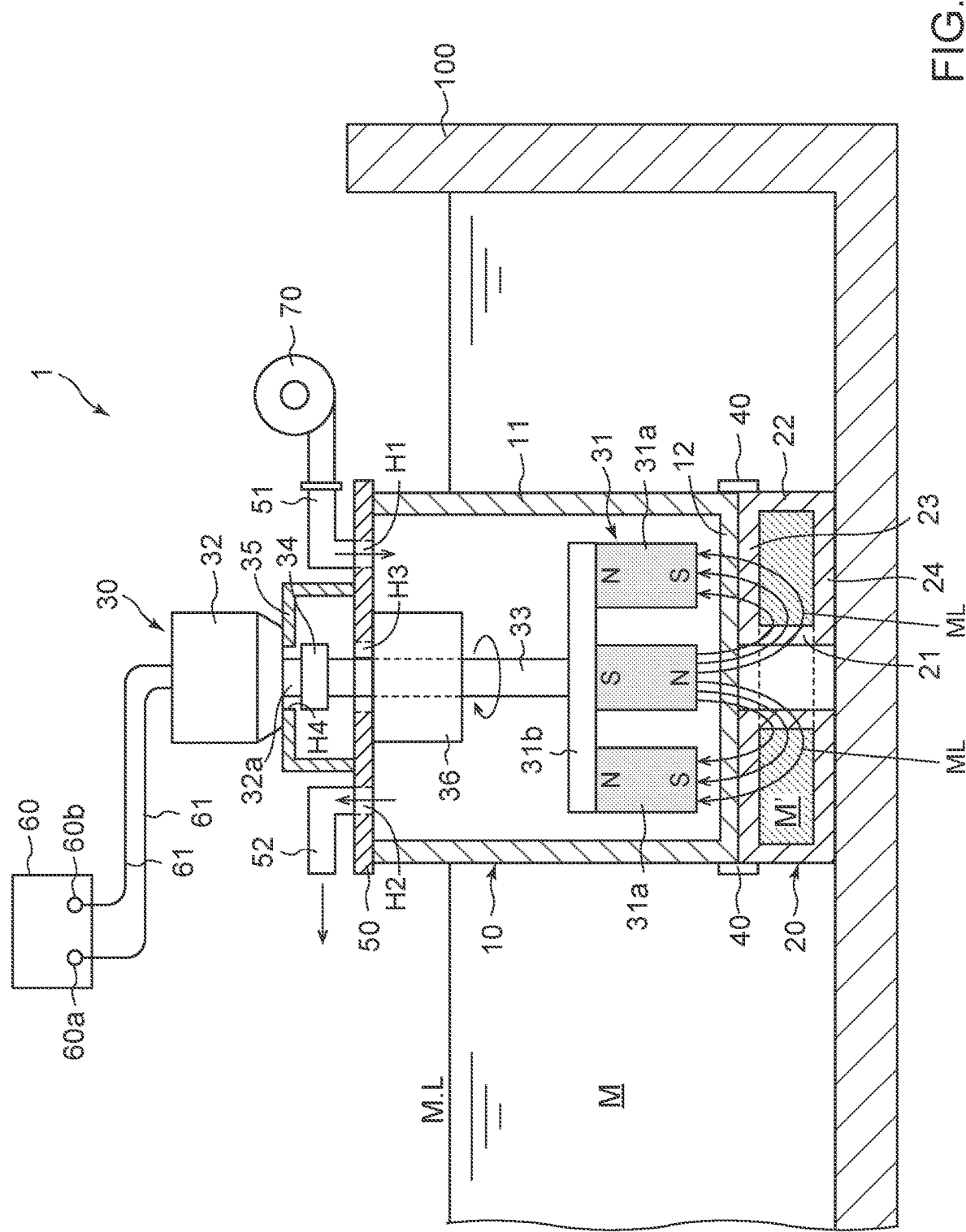
FIG. 7 is a cross-sectional view of the metal melt pump according to the embodiment that is immersed in metal melt inside a furnace during use.

As illustrated in FIG. 7, the metal melt pump 1 is sunk in metal melt M inside a furnace 100. The furnace 100 is, for example, a melting furnace for melting non-ferrous metal, such as aluminum, or a holding furnace for holding metal melt. It should be noted that the non-ferrous metal is not limited to aluminum, but may be, for example, Al, Cu, and Zn or an alloy of at least two of them, or an Mg alloy.

It is preferable that before installing the metal melt pump 1 inside the furnace 100, the bottomed cylinder body 10 and the melt flow passage body 20 be pre-heated for reducing the thermal impact. The pre-heating processing is performed by, for example, blowing hot air from the air intake hole H1.

After installing the metal melt pump 1 inside the furnace 100, the power control panel 60 is operated to drive the electric motor 32 at a rotation speed in accordance with a desired ejection amount. It should be noted that during the operation of the metal melt pump 1, cooling air is blown into the bottomed cylinder body 10 from the blower 70 via the air blowing pipe 51 and the air intake hole H1 to cool the magnetic field device 31. The cooling air is discharged from the air discharging pipe 52 to the outside.

Figure 8:
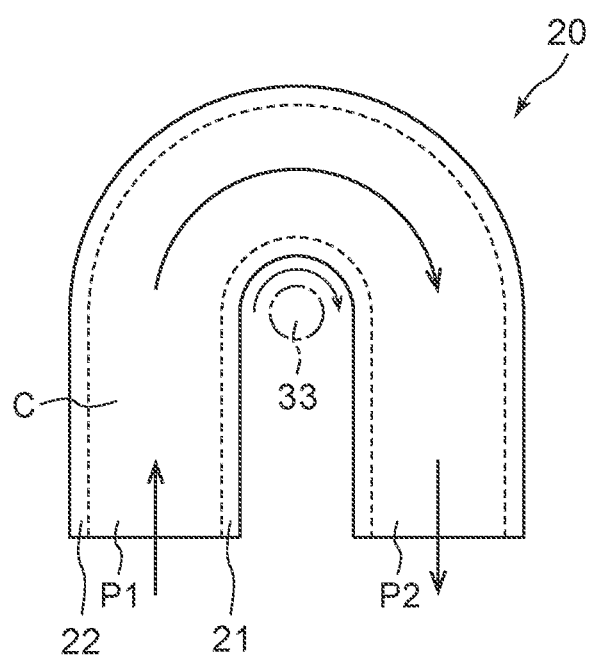
FIG. 8 is a plan view of the melt flow passage body according to the embodiment that is immersed in the metal melt inside the furnace during use.

With the rotation of the rotary shaft 32a of the electric motor 32, the magnetic field device 31 is rotated so that the magnetic force line ML that is output from a certain permanent magnet 31a to enter the adjacent permanent magnet 31a moves while penetrating metal melt M' in the melt flow passage C. The movement of the magnetic force line ML generates eddy current in the metal melt M'. By the electromagnetic force acting on the metal melt M' due to the eddy current, the metal melt M' is driven in the circumferential direction of the shaft 33 along the acceleration flow passage as illustrated in FIG. 8. In this manner, the metal melt M' in the melt flow passage C is ejected from the ejection port P2 and the external metal melt M in the furnace 100 is sucked from the suction port P1 into the melt flow passage C. As a result, the metal melt inside the furnace 100 circulates.

Figure 9:
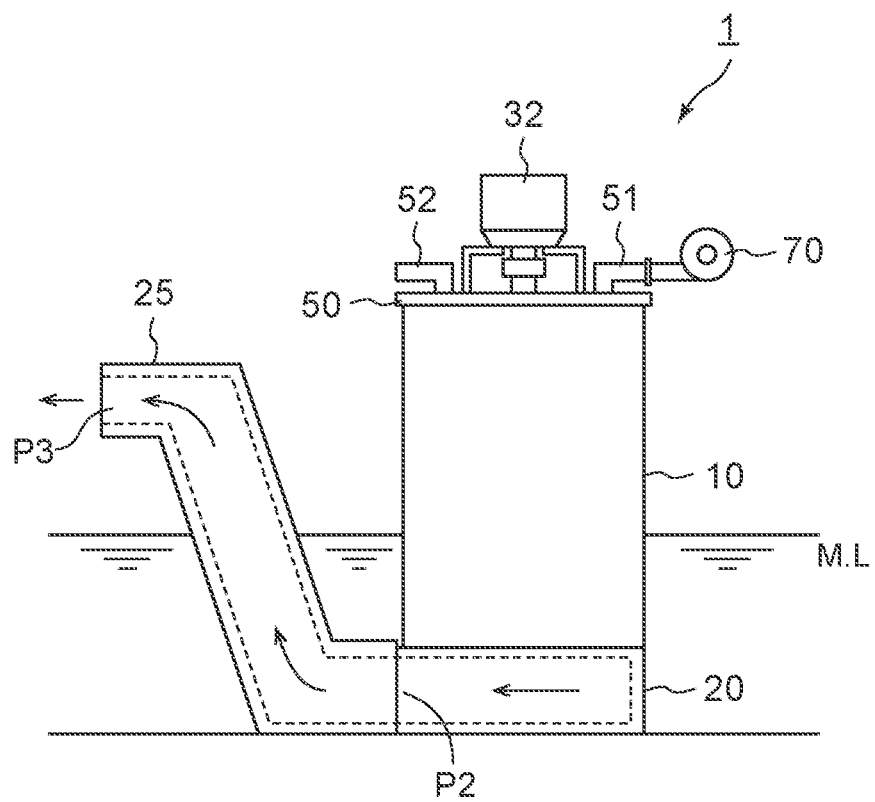
FIG. 9 is a side view of the metal melt pump with a melt discharge pipe mounted in an ejection port of the melt flow passage body according to the embodiment.

It should be noted that the metal melt pump 1 is usable not only for circulating the metal melt inside the furnace, but also for pumping the metal melt. In this case, as illustrated in FIG. 9, a melt discharge pipe 25 is connected to the ejection port P2 of the melt flow passage C. The melt discharge pipe 25 is connected at one end to the ejection port P2 of the melt flow passage body 20 and the other end (discharge port P3) is opened. The discharge port P3 is positioned above a melt level M.L in the state in which the metal melt pump 1 is installed inside the furnace. In this manner, the metal melt in the melt flow passage C is driven to be ejected from the ejection port P2, and then passes through the melt discharge pipe 25 to be pumped up into an external tub (not shown) or the like.

<Modification of Melt Flow Passage Body>

The melt flow passage body is not limited to the melt flow passage body 20 in a substantially U-shape with the longitudinal cross-section in a closed shape described above, but various melt flow passage bodies may be conceived. Hereinafter, melt flow passage bodies according to modifications 1 to 4 will be described with reference to FIG. 10A to FIG. 13B. The modifications 1 and 2 relate to the melt flow passage body with a planar shape in a substantially U-shape, but with the longitudinal cross-section not in a closed shape. The modifications 3 and 4 relate to the melt flow passage body with a planar shape not in a U-shape.

(Modification 1)

Figure 10A:
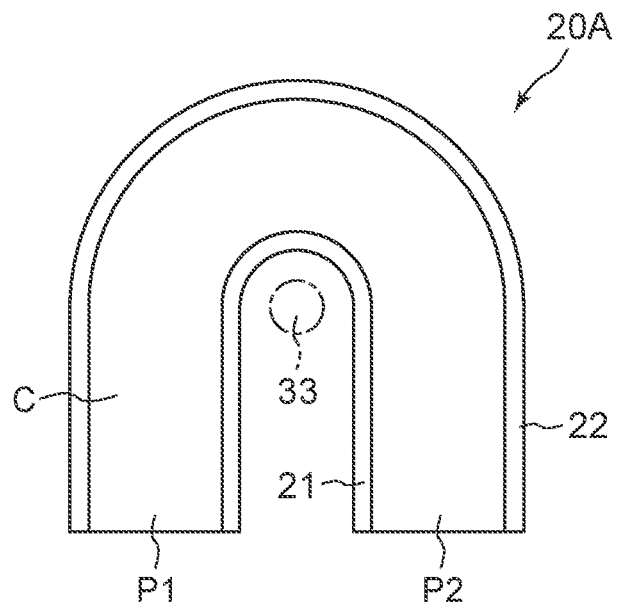
FIG. 10A is a plan view of a melt flow passage body according to a modification 1.
Figure 10B:
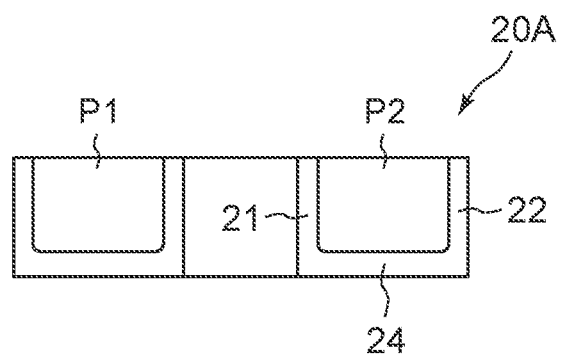
FIG. 10B is a side view of the melt flow passage body according to the modification 1.

With reference to FIG. 10A and FIG. 10B, a melt flow passage body 20A according to the modification 1 will be described. FIG. 10A is a plan view of the melt flow passage body 20A, and FIG. 10B is a side view of the melt flow passage body 20A.

The melt flow passage body 20A according to the present modification corresponds to the melt flow passage body 20 with the upper side flow passage wall 23 removed. That is, the melt flow passage body 20A includes the inner side flow passage wall 21, the outer side flow passage wall 22, and the lower side flow passage wall 24, with the upper face opened. In this manner, after use, the melt flow passage body 20A is removed from the bottomed cylinder body 10 and maintenance work, such as removal of metal solidified inside the melt flow passage C, can be easily performed. Further, since the upper side flow passage wall 23 is not provided, the distance between the melt flow passage C and the magnetic field device 31 is reduced, so that the melt driving efficiency can be improved.

It should be noted that in terms of securing the ejection pressure, it is preferable that upper end faces of the inner side flow passage wall 21 and the outer side flow passage wall 22 of the melt flow passage body 20A contact the bottom wall 12 of the bottomed cylinder body 10 with no gap as much as possible.

(Modification 2)

Figure 11A:
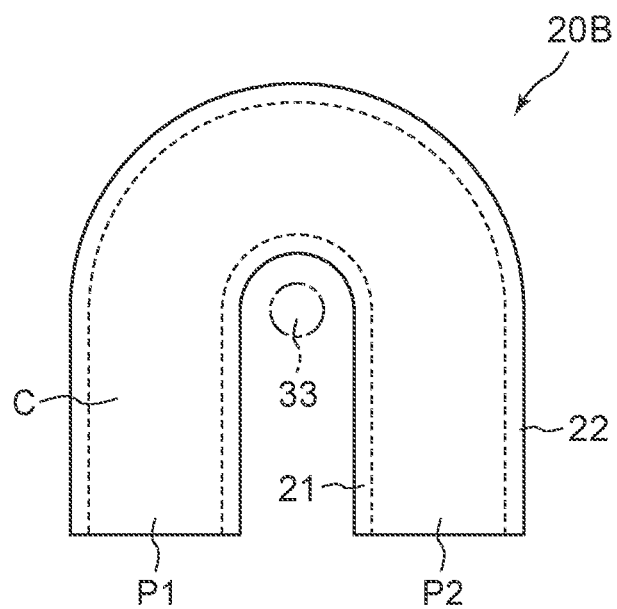
FIG. 11A is a plan view of a melt flow passage body according to a modification 2.
Figure 11B:
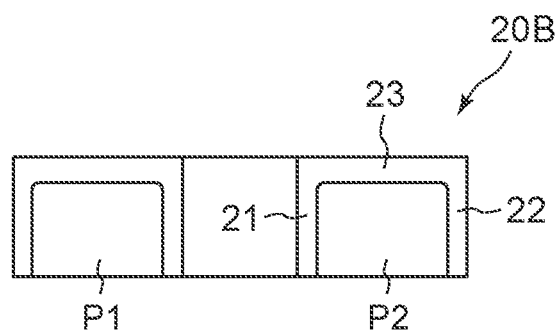
FIG. 11B is a side view of the melt flow passage body according to the modification 2.

Next, with reference to FIG. 11A and FIG. 11B, a melt flow passage body 20B according to the modification 2 will be described. FIG. 11A is a plan view of the melt flow passage body 20B, and FIG. 11B is a side view of the melt flow passage body 20B.

The melt flow passage body 20B according to the present modification corresponds to the melt flow passage body 20 with the lower side flow passage wall 24 removed. That is, the melt flow passage body 20B includes the inner side flow passage wall 21, the outer side flow passage wall 22, and the upper side flow passage wall 23, with the lower face opened. In this manner, after use, the melt flow passage body 20B is removed from the bottomed cylinder body 10 and maintenance work, such as removal of metal solidified inside the melt flow passage C, can be easily performed.

In the case where the melt flow passage body 20B of the present modification is used, it is necessary to sink the metal melt pump 1 to the bottom of the furnace to allow lower end surfaces of the inner side flow passage wall 21 and the outer side flow passage wall 22 to contact the bottom of the furnace. It should be noted that a case is expected in which a gap is created between the melt flow passage body 20B and the bottom of the furnace since the bottom of the furnace is not flat due to solidification of metal melt. However, even in such a case, it is not difficult to secure the ejection pressure that is enough to circulate the metal melt inside the furnace. A required ejection pressure can be secured by increasing the number of rotation of the electric motor 32, if necessary.
(Modification 3)

Figure 12A:
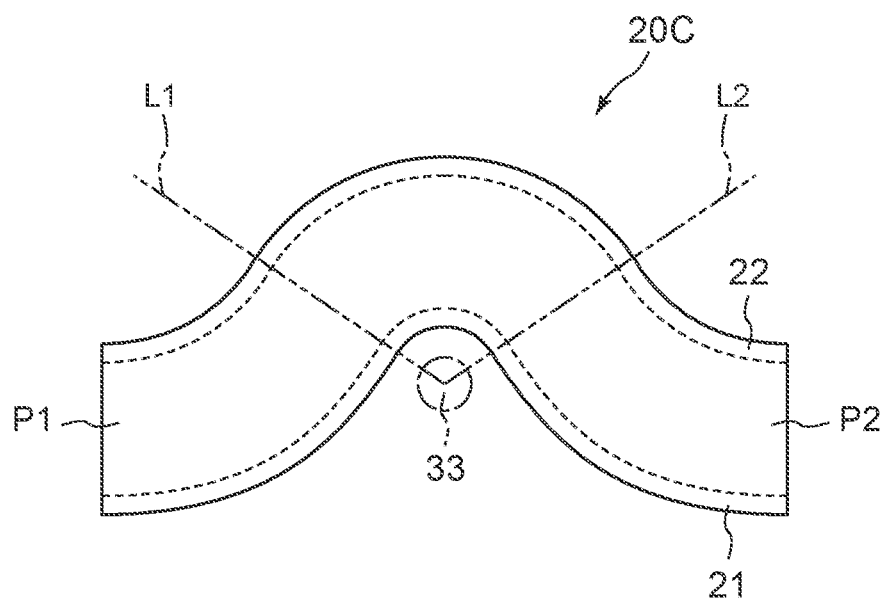
FIG. 12A is a plan view of a melt flow passage body according to a modification 3.
Figure 12B:
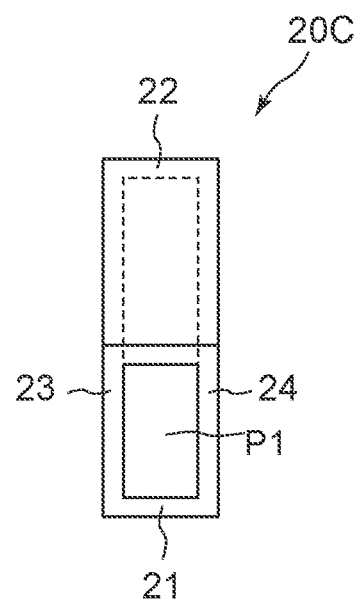
FIG. 12B is a side view of the melt flow passage body according to the modification 3.

Next, with reference to FIG. 12A and FIG. 12B, a melt flow passage body 20C according to the modification 3 will be described. FIG. 12A is a plan view of the melt flow passage body 20C, and FIG. 12B is a side view of the melt flow passage body 20C.

The melt flow passage body 20C according to the present modification has a longitudinal cross-section in a closed shape as with the melt flow passage body 20, but has a planar shape in a wave shape. That is, the melt flow passage body 20C includes the inner side flow passage wall 21, the outer side flow passage wall 22, the upper side flow passage wall 23, and the lower side flow passage wall 24, with the longitudinal cross-section in a closed shape. Further, the planar shape of the melt flow passage body 20C is a wave shape and the suction port P1 and the ejection port P2 are on the same straight line.

The melt flow passage body 20C is suitable for a case in which the metal melt pump 1 is installed in a peripheral portion of the furnace 100, for example.

According to the present modification, while the suction port P1 and the ejection port P2 are on the same straight line, since the melt flow passage C includes the acceleration flow passage (flow passage sandwiched between lines L1 and L2) along the rotating direction of the magnetic field device 31, the metal melt in the melt flow passage C can be efficiently driven.

It should be noted that in the melt flow passage body 20C, the upper side flow passage wall 23 or the lower side flow passage wall 24 may be removed to open the upper face or the lower face, as in the modifications 1 and 2.
(Modification 4)

Figure 13A:
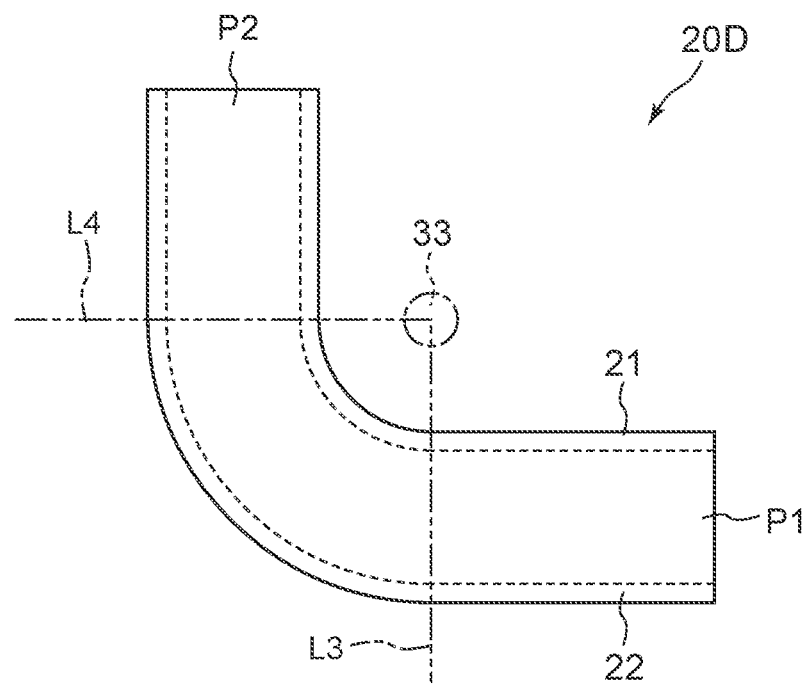
FIG. 13A is a plan view of a melt flow passage body according to a modification 4.
Figure 13B:
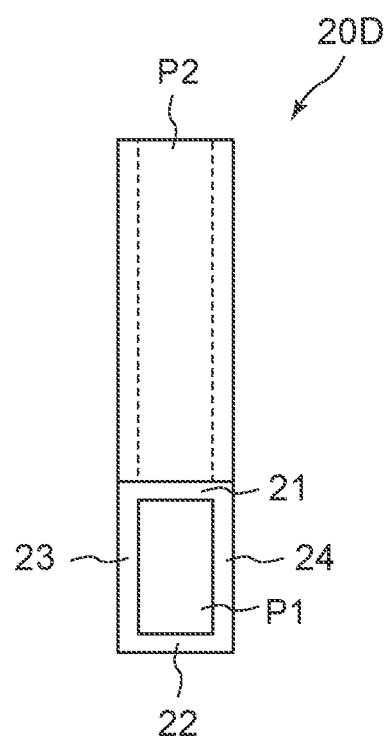
FIG. 13B is a side view of the melt flow passage body according to the modification 4.

Next, with reference to FIG. 13A and FIG. 13B, a melt flow passage body 20D according to the modification 4 will be described. FIG. 13A is a plan view of the melt flow passage body 20D, and FIG. 13B is a side view of the melt flow passage body 20D.

The melt flow passage body 20D according to the present modification has a longitudinal cross-section in a closed shape as with the melt flow passage body 20, but has a planar shape in a substantially L-shape. That is, the melt flow passage body 20D includes the inner side flow passage wall 21, the outer side flow passage wall 22, the upper side flow passage wall 23, and the lower side flow passage wall 24, with the longitudinal cross-section in a closed shape. Further, the planar shape of the melt flow passage body 20D is a substantially L-shape, and an opening face of the suction port P1 and an opening face of the ejection port P2 are orthogonal to each other.

The melt flow passage body 20D is suitable for a case in which the metal melt pump 1 is installed at a corner (inside corner) of the furnace 100, for example.

According to the present modification, while the opening faces of the suction port P1 and the ejection port P2 are orthogonal to each other, since the melt flow passage C includes the acceleration flow passage (flow passage sandwiched between lines L3 and L4) along the rotating direction of the magnetic field device 31, the metal melt in the melt flow passage C can be efficiently driven.

It should be noted that in the melt flow passage body 20D, the upper side flow passage wall 23 or the lower side flow passage wall 24 may be removed to open the upper face or the lower face, as in the modifications 1 and 2.

Further, the opening faces of the suction port P1 and the ejection port P2 may cross each other at an acute angle or an obtuse angle, without limiting to being orthogonal to each other.

A person skilled in the art may be able to conceive of additional effects or various modifications of the present invention on the basis of the above description, but the aspect of the present invention is not limited to the aforementioned embodiment. Various additions, modifications, and partial deletion are available without departing the conceptual idea and the gist of the present invention derived from the content defined in the claims and the equivalents thereof.

REFERENCE NUMERAL LIST 1 metal melt pump
10 bottomed cylinder body
11 side wall
12 bottom wall
13 projection for fixation
20, 20A, 20B, 20C, 20D melt flow passage body
21 inner side flow passage wall
22 outer side flow passage wall
23 upper side flow passage wall
24 lower side flow passage wall
25 melt discharge pipe
30 melt driving part
31, 31A magnetic field device
31*a* permanent magnet
31*b* support plate
32 electric motor
32*a* rotary shaft
33 shaft
34 coupling
35 mount
36 bearing housing
40 fixture
50 cover body
51 air blowing pipe
52 air discharging pipe
60 power control panel
60*a*, 60*b* terminal
61 connecting conductor
70 blower
100 furnace
C melt flow passage
C1 acceleration flow passage
C2 inlet side flow passage
C3 outlet side flow passage
H1 air intake hole
H2 air discharge hole
H3, H4 shaft insertion hole
H5 air hole
M, M' metal melt
ML magnetic force line
P1 suction port
P2 ejection port
P3 discharge port
R recess (of melt flow passage body)

What is claimed is:
1. A metal melt pump comprising:
a bottomed cylinder body including a side wall and a bottom wall;
a melt flow passage body including a melt flow passage that connects a suction port and an ejection port, the melt flow passage body being a body separate from the bottomed cylinder body; and a melt driving part including a magnetic field device rotatably disposed around a vertically oriented rotary shaft inside the bottomed cylinder body and an electric motor that rotates the magnetic field device, wherein the suction port opens on a side surface of the melt flow passage body, the magnetic field device includes a plurality of permanent magnets, the plurality of permanent magnets each have an upper face magnetic pole and a lower face magnetic pole that are magnetized such that an upper face portion and a lower face portion become magnetic poles, the plurality of lower face magnetic poles of the plurality of permanent magnets vertically face the bottom wall, the plurality of permanent magnets are arranged such that lower face magnetic poles with different polarities are alternately arrayed along a circumference of the rotary shaft, and the melt flow passage body is removably provided on the bottomed cylinder body at a position below the bottomed cylinder body and where a magnetic force line from a first permanent magnet among the plurality of permanent magnets penetrates through the bottom wall of the bottomed cylinder body downward to reach the melt flow passage and penetrates from the melt flow passage through the bottom wall of the bottomed cylinder body upward to return to a second permanent magnet adjacent to the first permanent magnet, wherein the bottom wall of the bottomed cylinder body is provided with a projection for fixation, the projection for fixation engages with a recess surrounded by an inner side flow passage wall of the melt flow passage body.

2. The metal melt pump according to claim 1, wherein the melt flow passage body comprises an inner side flow passage wall, an outer side flow passage wall, an upper side flow passage wall, and a lower side flow passage wall, with a longitudinal cross-section in a closed shape.

3. The metal melt pump according to claim 1, wherein the melt flow passage body comprises an inner side flow passage wall, an outer side flow passage wall, and a lower side flow passage wall, without including an upper side flow passage wall, with an upper face opened.

4. The metal melt pump according to claim 1, wherein the melt flow passage body comprises an inner side flow passage wall, an outer side flow passage wall, and an upper side flow passage wall, without including a lower side flow passage wall, with a lower face opened.

5. The metal melt pump according to claim 1, wherein the melt flow passage comprises:

an acceleration flow passage along a rotating direction of the magnetic field device;

an inlet side flow passage that connects the suction port and the acceleration flow passage; and an outlet side flow passage that connects the acceleration flow passage and the ejection port.

6. The metal melt pump according to claim 5, wherein the melt flow passage body has a planar shape in a substantially U-shape.

7. The metal melt pump according to claim 5, wherein the melt flow passage body has a planar shape in a wave shape.

8. The metal melt pump according to claim 5, wherein the melt flow passage body has a planar shape in a substantially L-shape.

9. The metal melt pump according to claim 1, wherein a longitudinal cross-sectional shape of the melt flow passage is a laterally-long and substantially rectangular shape.

10. The metal melt pump according to claim 1, wherein the melt flow passage body is removably attached to the bottomed cylinder body by means of a fixture.

* * * * *